United States Patent [19]

Ogata

[11] Patent Number: 5,412,488
[45] Date of Patent: May 2, 1995

[54] DATA PROCESSING APPARATUS DUAL-BUS DATA PROCESSING WITH REDUCED CPU AND MEMORY REQUIREMENTS

[75] Inventor: Yukihiko Ogata, Kawasaki, Japan

[73] Assignee: Canon Kabushiki Kaisha, Tokyo, Japan

[21] Appl. No.: 886,874

[22] Filed: May 22, 1992

[30] Foreign Application Priority Data

May 24, 1991 [JP] Japan ................... 3-119757

[51] Int. Cl.⁶ ............................................. G06F 13/00
[52] U.S. Cl. .................... 358/455; 358/437; 358/443
[58] Field of Search ............... 358/443, 455, 256, 257, 358/280, 426, 261.4, 261.1, 261.3, 260, 241, 444, 437, 494, 296, 448, 401, 404, 442, 456, 406; 364/900, 200; 379/356, 100, 387; 395/275, 725, 550, 146, 155, 162, 425, 375

[56] References Cited

U.S. PATENT DOCUMENTS

| | | | |
|---|---|---|---|
| 4,075,691 | 2/1978 | Davis et al. | 364/200 |
| 4,748,662 | 5/1988 | Hirata | 379/356 |
| 4,829,467 | 5/1989 | Ogata | 394/900 |
| 4,856,052 | 8/1989 | Hirata | 358/443 X |
| 4,887,224 | 12/1989 | Okano et al. | 358/426 X |
| 4,920,427 | 4/1990 | Hirata | 358/437 |
| 5,038,218 | 8/1991 | Matsumoto | 358/296 |
| 5,175,633 | 12/1992 | Saito et al. | 358/406 |
| 5,179,667 | 1/1993 | Iyer | 395/275 |
| 5,193,143 | 3/1993 | Iyer | 395/725 |
| 5,220,648 | 6/1993 | Sato | 395/146 |
| 5,228,128 | 7/1993 | Kim | 358/442 |
| 5,229,865 | 7/1993 | Murayama | 358/443 |
| 5,235,694 | 8/1993 | Umeda | 395/425 |

Primary Examiner—Paul Ip
Attorney, Agent, or Firm—Fitzpatrick, Cella, Harper & Scinto

[57] ABSTRACT

Disclosed is a data processing apparatus which makes it possible to perform data processing at high speed by efficiently using a plurality of buses with a small number of microprocessors. The apparatus may be realized in the form of a facsimile apparatus including: a first bus connected to a microprocessor; a second bus which is not connected to the microprocessor; a memory connected to both the first and second buses; a memory control section which mediates between memory accesses from these buses so as to allow each of them to use the memory; a group of circuits for performing data processing through the second bus under the control of the microprocessor; and a DMA controller for effecting high-speed data transfer between each of the circuits and the memory.

15 Claims, 7 Drawing Sheets

DATA PROCESSING APPARATUS DUAL-BUS DATA PROCESSING WITH REDUCED CPU AND MEMORY REQUIREMENTS

BACKGROUND OF THE INVENTION

This invention relates to a data processing apparatus which performs image processing at high speed, for example, a G4 facsimile apparatus.

An image processing apparatus which must perform image processing at high speed, for example, a G4 facsimile apparatus, has conventionally adopted a construction in which an image bus dedicated to image processing is separated from a main CPU bus connected to a main CPU for controlling the entire apparatus.

FIG. 3 shows an example of the construction of a conventional G4 facsimile apparatus.

A main CPU 301 controls the operation of the entire facsimile apparatus, and is connected to a main CPU bus 3a. Connected to this main CPU bus are a ROM 302 for scoring instruction programs on the operations to be performed by the main CPU 301, a RAM 303 for storing operation data, a communication-control-circuit DMAC (direct memory access controller) 304, a communication control circuit 305, and an image memory 306. The communication control circuit 305 performs transmission and reception of data with a terminal at the other end of a line 3c. After performing communication processes by a predetermined procedure, the communication control circuit 305 utilizes the communication-control-circuit DMAC 304 to write the received data to an image memory or, conversely, to read image data for transmission from the image memory and transmit the same to the line.

A local CPU 307 mainly controls image processing. By using a part of the image memory 306, the local CPU 307 can perform an inter-CPU communication with the main CPU 301, giving and receiving commands to and from each other. The local CPU 307 operates to execute processes as demanded by the main CPU 301. A local ROM 308 and a local RAM 309 are used for the operations of the local CPU 307. Their functions in connection with the local CPU 307 are the same as those of the main ROM 302 and the main RAM 303 in connection with the main CPU 301.

A DMAC 310 performs image data transfer between the image memory 306 and an image processing circuit 311, or between the image memory 306 and a printer interface circuit 312, or between the image memory 306 and a scanner interface circuit 313. To effect this image transfer, the local CPU gives a command to the DMAC 310 in accordance with a command from the main CPU. Through the above processes, image data received from the line is image-processed through the image memory 306 and supplied to a printer 314, or image data received from a scanner 315 is image-processed and transmitted to the line via the image memory 306 and the communication control circuit 305.

A problem with the above conventional system is that it requires a plurality of CPUs, i.e., main and local CPUs. Further, to operate these CPUs, it is necessary to provide a plurality of peripheral circuits each including ROM, RAM, etc. Thus, the system requires a complicated circuit configuration and is rather expensive.

Further, since a plurality of CPUs perform communication through a memory, each CPU requires an inter-CPU communication program of its own, the commands being given to an image processing circuit, a DMAC, etc. through these programs, with the result that command transmission takes a long time.

In addition, commands from the local CPU are given to a DMAC, an image processing circuit, etc. through an image bus, so that the image bus is occupied by the local CPU for the while, thereby deteriorating the image data transfer efficiency.

SUMMARY OF THE INVENTION

The present invention has been made in view of the above problems in the prior art. It is accordingly an object of this invention to provide a data processing apparatus having two or more buses which is capable of realizing high-speed data processing through these buses with a small number of microprocessors.

To achieve the above object, there is provided, in accordance with the present invention, a data processing apparatus comprising:
  a microprocessor for controlling the entire apparatus;
  a first bus connected to said microprocessor;
  at least one second bus which is not connected to said microprocessor;
  a memory connected to both said first and second buses and allowing access from each of said buses;
  at least one processing circuit connected to said second bus and adapted to perform a predetermined process with respect to given data under the control of said microprocessor; and
  DMA means connected to said second bus and adapted to perform a data transfer process at least between one of said processing circuits and said memory under the control of said microprocessor.

Another object of the present invention is to provide a data processing apparatus which allows circuits in a plurality of buses to perform unitary processing with a small number of microprocessors.

To achieve this object, the present invention provides a data processing apparatus comprising:
  a first bus connected to a microprocessor for controlling the entire apparatus;
  at least one second bus which is not connected to said microprocessor;
  a memory connected to said first and second buses; and
  memory control means which mediates between memory access from said first bus and memory access from said second bus so as to allow these buses to use said memory in a predetermined order of priority.

Still another object of the present invention is to provide a facsimile apparatus which is capable of performing the reading to the transmission of images efficiently and at high speed.

To achieve this object, the present invention provides a facsimile apparatus for communicating image data comprising:
  a microprocessor for controlling the entire apparatus;
  a first bus connected to said microprocessor;
  at least one second bus which is not connected to said microprocessor;
  a memory connected to both said first and second buses and allowing access from each of the buses;
  reading means for reading original images;
  an image processing circuit for coding image data transmitted thereto through said second bus, under the control of said microprocessor;

transmission means connected to said first bus and adapted to transmit information through a line;

first DMA means for (a) DMA-transferring image data read by said image reading means to said memory through said second bus, (b) DMA-transferring the image data transferred to said memory to said image processing circuit through said second bus, and (c) DMA-transferring the data coded by said image processing circuit to said memory through said second bus, under the control of said microprocessor; and second DMA means for DMA-transferring the coded data transferred to said memory by said first DMA means to said transmission means through said first bus, under the control of said microprocessor.

A further object of the present invention is to provide a facsimile apparatus which is capable of performing the receiving to the printing of images efficiently and at high speed.

To achieve this object, the present invention provides a facsimile apparatus for communicating image data comprising:

a microprocessor for controlling the entire apparatus;
a first bus connected to said microprocessor;
at least one second bus which is not connected to said microprocessor;
a memory connected to both said first and second buses and allowing access from each of these buses;
receiving means connected to said first bus and adapted to receive coded image data through a line;
an image processing circuit for decoding coded image data transmitted thereto from said second bus, under the control of said microprocessor;
printing means for printing images;
first DMA transfer means for DMA-transferring the coded image data received by said receiving means to said memory through said first bus, under the control of said microprocessor; and
second DMA transfer means for (a) DMA-transferring coded image data stored by said first DMA means to said image processing circuit through said second bus, (b) DMA-transferring the image data decoded by said image processing circuit to said memory through said second bus, and (c) DMA-transferring the decoded image data transferred to said memory to said printing means through said second bus, under the control of said microprocessor.

Other features and advantages of the invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment of the present invention will now be described in detail with reference to the accompanying drawings. The embodiment will be described as applied to a facsimile apparatus.

Figure 1:
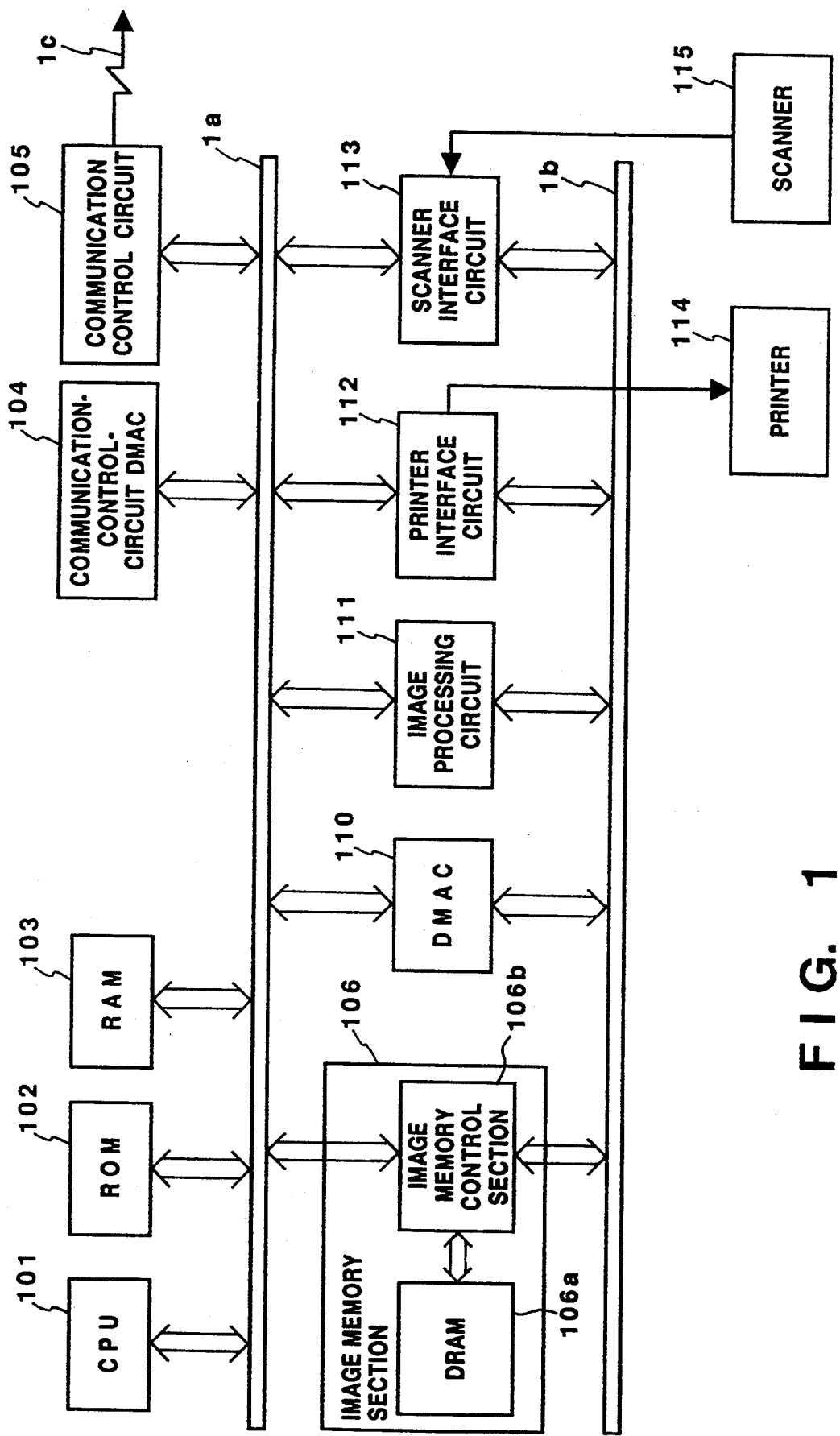
FIG. 1 is a block diagram of a facsimile apparatus constituting an embodiment of the present invention.

FIG. 1 is a block diagram showing a facsimile apparatus according to the embodiment.

Figure 2:
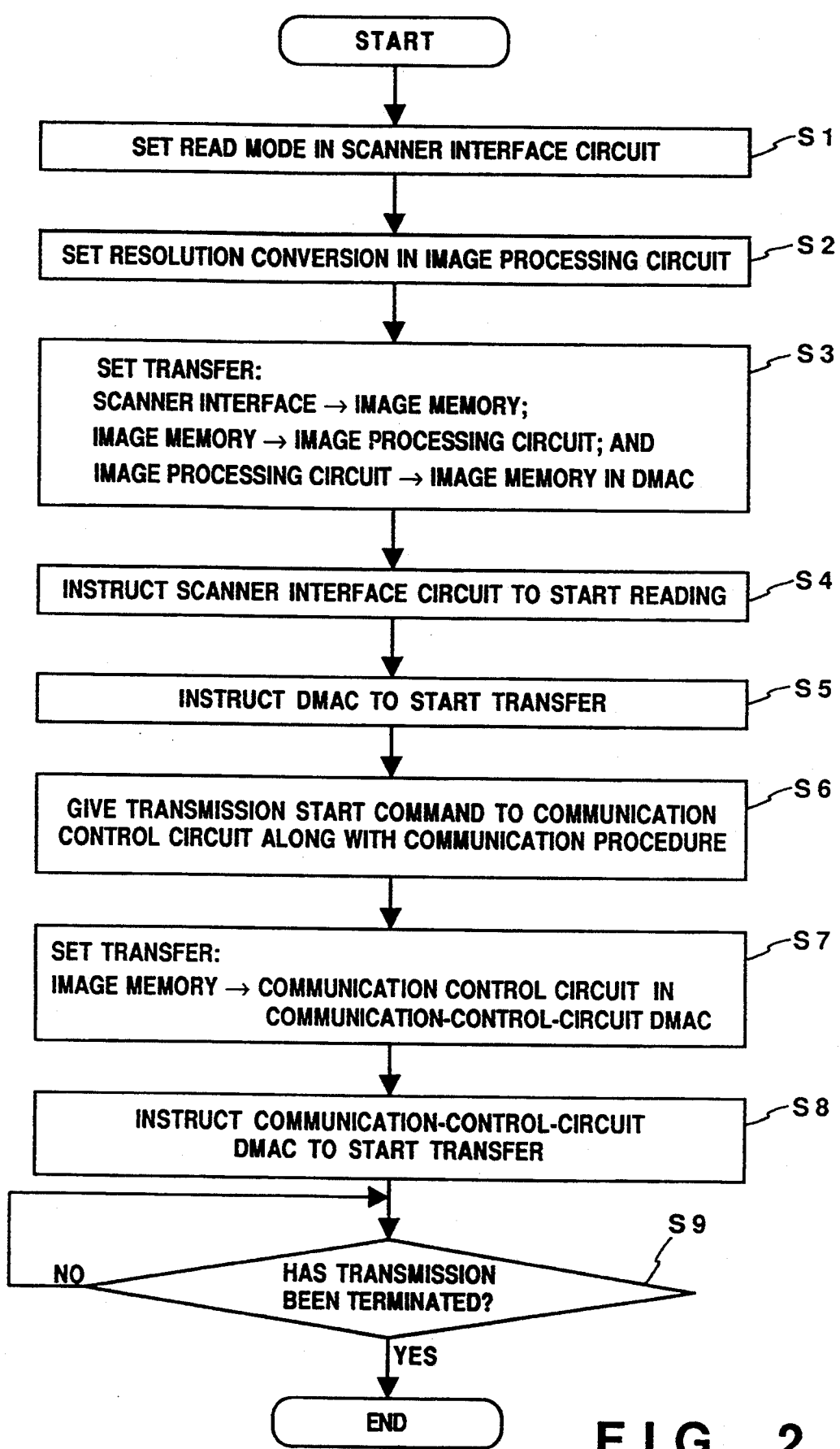
FIG. 2 is a flowchart illustrating a transmitting operation of the embodiment.
Figure 3:
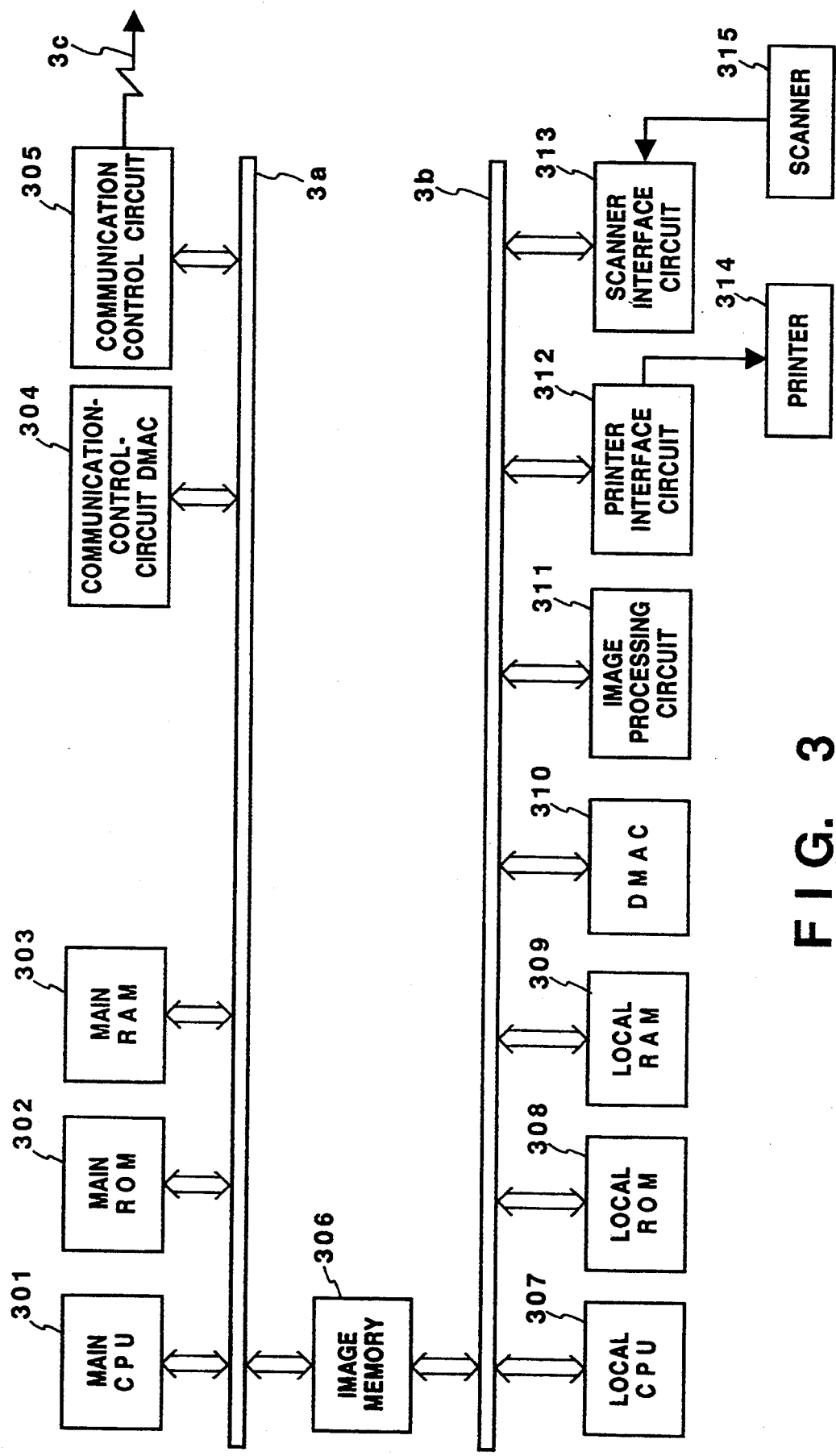
FIG. 3 is a block diagram of a conventional facsimile apparatus.
Figure 7:
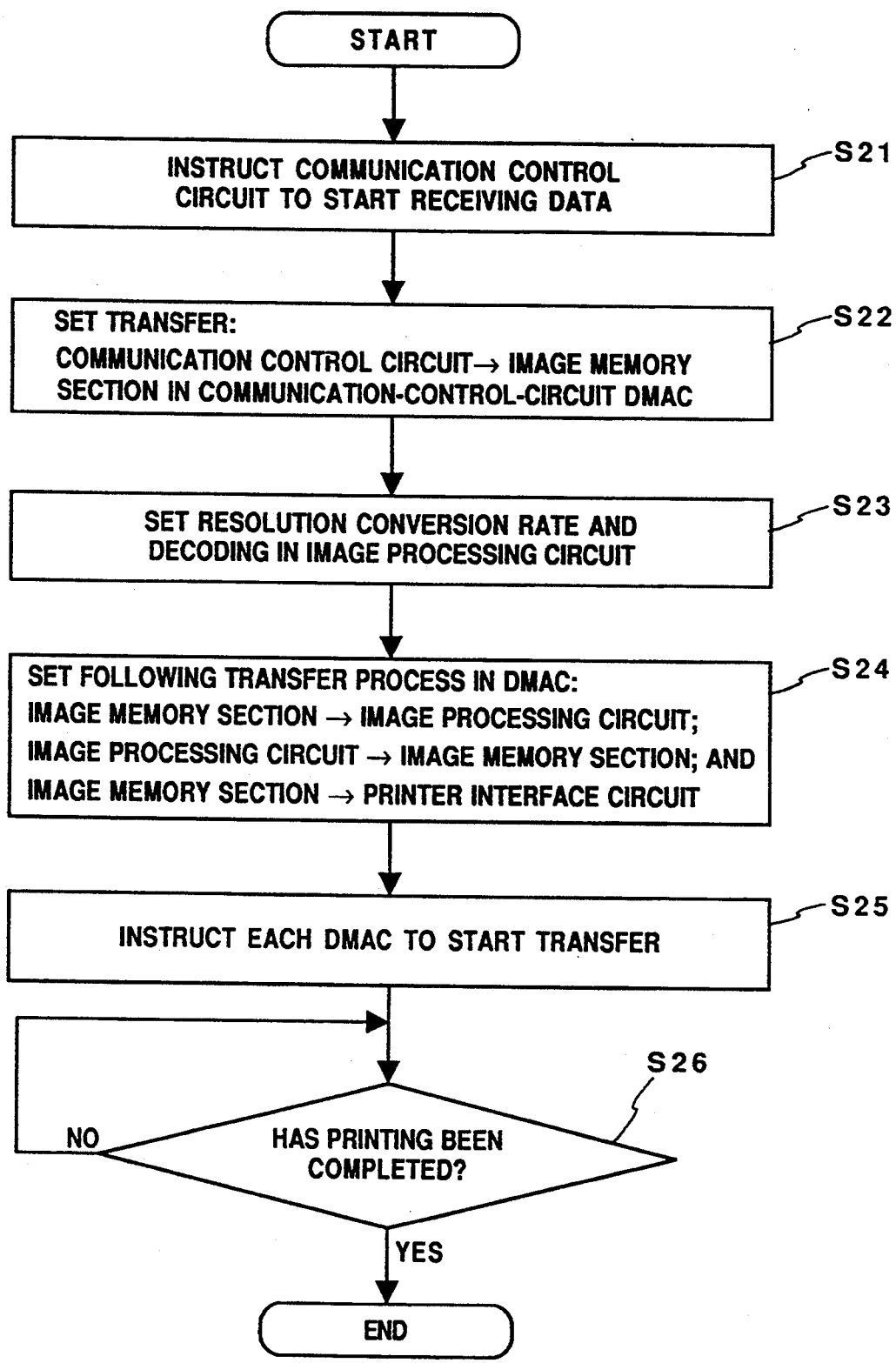
FIG. 7 is a flowchart schematically illustrating a reception data flow in the facsimile apparatus of that embodiment.

As shown in the drawing, the apparatus of this embodiment has first and second buses 1a and 1b. Connected to the first bus 1a are a CPU 101 for performing general control over the entire apparatus, a ROM 102 for storing operation programs (for example, the flowchart programs shown in FIG. 2 and 7) for the CPU 101, a RAM 103 for storing operation data, a communication control circuit 105 for controlling the giving and receiving of data between this apparatus and a line 1c, etc.

The second bus 1b is a bus which is mainly used for transferring image data only.

An image memory section 106 is connected to both the first and second buses. The image memory section 106 includes a dynamic RAM (DRAM) 106a which actually stores data and an image memory control section 106b which mediates between access requests from the first and second buses so as to allow each bus to gain access.

In this embodiment, the frequency of the clocks supplied to the circuits connected to the first and second buses is 10 MHz. However, clocks of a frequency several times (e.g., twice) as high as that are supplied to the interior of the image memory 106. Thus, the image memory section 106 operates in synchronism with clocks at a higher speed.

When there are any access requests from these buses, the image memory control section 106, the image memory control section 106b allows them to gain access, giving priority to that bus which has issued the access request earlier. When the access from that bus has been completed, the image memory control section 106b allows access from the other bus. However, as stated above, the frequency of the synchronization clocks supplied to the image memory control section 106b and the DRAM 106a is several times higher than that of the system clocks in the first and second buses, so that it is apparently possible to access simultaneously from both sides, as seen from each bus.

That is, as will be described below, it is possible to perform the following two operations at the same time: (i) the DMA-transfer of coded data stored in the image memory section 106 to the communication control circuit 105 by a communication control DMAC 104 connected to the first bus 1a; and (ii) the transfer of image data read from a scanner 115 to the image memory section 106 by a DMAC 110 belonging in common to the two buses.

The DMAC 110 receives a transfer command from the CPU 101 through the first bus 1a, and outputs an address onto the second bus 1b so as to perform DMA transfer in accordance with the command. An image processing circuit 111 receives an image processing command from the CPU 101 through the first bus and performs data input/output operations by using the second bus.

A printer interface circuit 112 receives printing data supplied from the image memory section 106 through the second bus 1b in accordance with a command from the CPU 101, and supplies the data to a printer 114. A scanner interface circuit 113 inputs image data read by a scanner circuit 115 in accordance with a command from the CPU 101, and outputs the data onto the second bus 1b.

The image processing circuit 111 includes a resolution conversion circuit and a coding/decoding circuit for coding and decoding image data. The converting operation in the resolution conversion circuit is performed through thinning-out and interpolation processing, which are well known. Further, the process performed in the coding/decoding circuit is also well known, so an explanation thereof will be omitted. However, it may be noted here that each of the circuits connected to the buses in this embodiment, including the image processing circuit 111, is provided with buffer memory of a predetermined capacity. The image processing circuit 111 is provided with a buffer memory for storing data on the object of processing and a buffer memory for temporarily storing data generated in processing.

Further, the facsimile apparatus of this embodiment is provided with an operation panel (not shown). This operation panel enables the telephone number of an apparatus at the other end of the line to be stored in the RAM 103. With this operation panel, it is possible to designate an apparatus at the other end of the line through abbreviated dialing to transmit an original image thereto. The data to be stored by using the operation panel includes the type of apparatus at the other end of the line (e.g., whether it is G3 or G4).

The operator sets an original to the scanner 115 and designates an apparatus at the other end of the line, thereby starting the following process:

First, in step S1, the CPU 101 sets the scanner interface circuit 113 to a reading mode, and in step S2, it performs the setting of the resolution conversion rate for the image processing circuit 111. This setting has to be performed in the case where there is a difference between the reading resolution of the scanner 115 of this embodiment and the printing resolution of the apparatus at the other end of the line. For example, the printing resolution of a G3 type facsimile apparatus is different from that of a G4 type facsimile apparatus. This resolution conversion setting is performed with a view to enabling the read image to be transmitted to the designation of the transmission. Accordingly, if the reading resolution of the apparatus of the embodiment is equal to the printing resolution of the apparatus at the other end of the line, a magnification of 100% (the same size) is set for the image processing circuit 111.

Next, the procedure advances to step S3, where CPU 101 sets parameters for three data transfer processes.

One of the three data transfer processes is from a buffer memory in the scanner interface circuit 113 to the image memory section 106. In this process, the CPU 101 sets, in the DMAC 110, an address in the scanner interface circuit 113, the address of the DRAM 106a to which data is to be written, the updating directions of these addresses, and the number of words transferred, as parameters.

The second transfer process is to transfer image data stored in the image memory section 106 to the image processing circuit 111. As described above, a memory for storing data on the object of processing exists in the image processing circuit ill of the embodiment, so that, in this case, an inter-memory DMA transfer is performed. The CPU 101 sets, in the DMAC 110, the reading start address in the DRAM 106a, the writing start address of the receiving buffer in the image processing circuit 111, the updating directions of these addresses, and the number of words transferred, as parameters.

The third transfer process is the transfer of the data processed by the image processing circuit 111 (which is stored in an output memory) to the image memory section 106 again. In this transfer process, the leading address of the output buffer in the image processing circuit 111, the storage start address of the DRAM 106a, the up-dating directions of these addresses, and the number of words transferred are set as parameters.

The CPU 101 sets the parameters for the above three transfer processes in the DMAC 110. However, to prevent premature overwriting in the transfer processes, the CPU 101 makes a judgment on each address that is set.

When the transfer setting operations have all been completed in this way, the procedure advances to step S4, where the CPU 101 outputs an instruction signal for starting the reading of an original image to the scanner interface 113, whereby the scanner 115 starts reading the original image, and image data starts to be stored in a buffer (not shown) in the scanner interface circuit 113.

When this reading start instruction has been completed, the CPU 101 immediately gives the DMAC 110 a DMA transfer start instruction in accordance with the setting previously made.

This instruction causes the read image to be DMA-transferred to the DRAM 106a in the image memory section 106 and stored therein and, at the same time, causes the image data stored in the DRAM 106a to be DMA-transferred to the input buffer in the image processing circuit 111. Further, MMR coding data after pixel density conversion stored in the output buffer in the image processing circuit 111 is DMA-transferred to the DRAM 106a. It should be noted, however, that the above transfer processes are all performed through the second bus 1b.

In this way, data which has undergone pixel density conversion and which has been coded is successively stored at predetermined addresses in the DRAM 106a. To transmit the coded data thus generated to the designated apparatus at the other end of the line, the CPU 101 performs setting in the next step, i.e., step S8, such that the data the coded data of which is stored in the communication control DMAC 104 is transferred to the communication control circuit 105. Then, in step S9, the CPU gives a transfer start instruction to the communication control DMAC 104, thereby starting the transmission of the image data to the designated apparatus at the other end of the line.

This process is continued until it is determined, in step S9, that the transmission of all the data has been completed.

Here, the DMAC 110 of this embodiment will be described.

The DMAC 110 of this embodiment has the function of setting three data transfer processes and performing these transfer processes substantially at the same time. Although it has actually a one-chip structure, the DMAC may also be realized in a combination of a plurality of well-known DMACs.

First, the DMAC 110 of this embodiment may receive a transfer request signal from the scanner interface 113, the printer interface 112, the image processing circuit 111, or the image memory control section 106b. For example, the scanner interface 113 generates a transfer request signal when a predetermined amount of reading image data has been stored in the buffer memory provided therein. The image processing circuit 111 generates a transfer request signal when coded data has been stored to some extent in the output buffer. Further, the image memory control section 106 generates a request to transfer data to the image processing circuit 111 when the amount of read image data (the data transferred from the scanner interface 113) has reached a predetermined amount. Instead of causing the image memory control circuit 106b to generate a transfer request signal, such a transfer request signal may be generated when a count value indicating the amount of data transferred from the scanner interface circuit 113 to the image memory section 106 has reached a predetermined value.

In this embodiment, each circuit generates such a request signal each time 8 Kbytes of data to be transferred has been stored.

Upon receiving a transfer request from any of the circuits, the DMAC 110 stack-stores the same, and a transfer process is performed with respect to that one of these stacked-stored requests received earliest of all.

Figure 6:
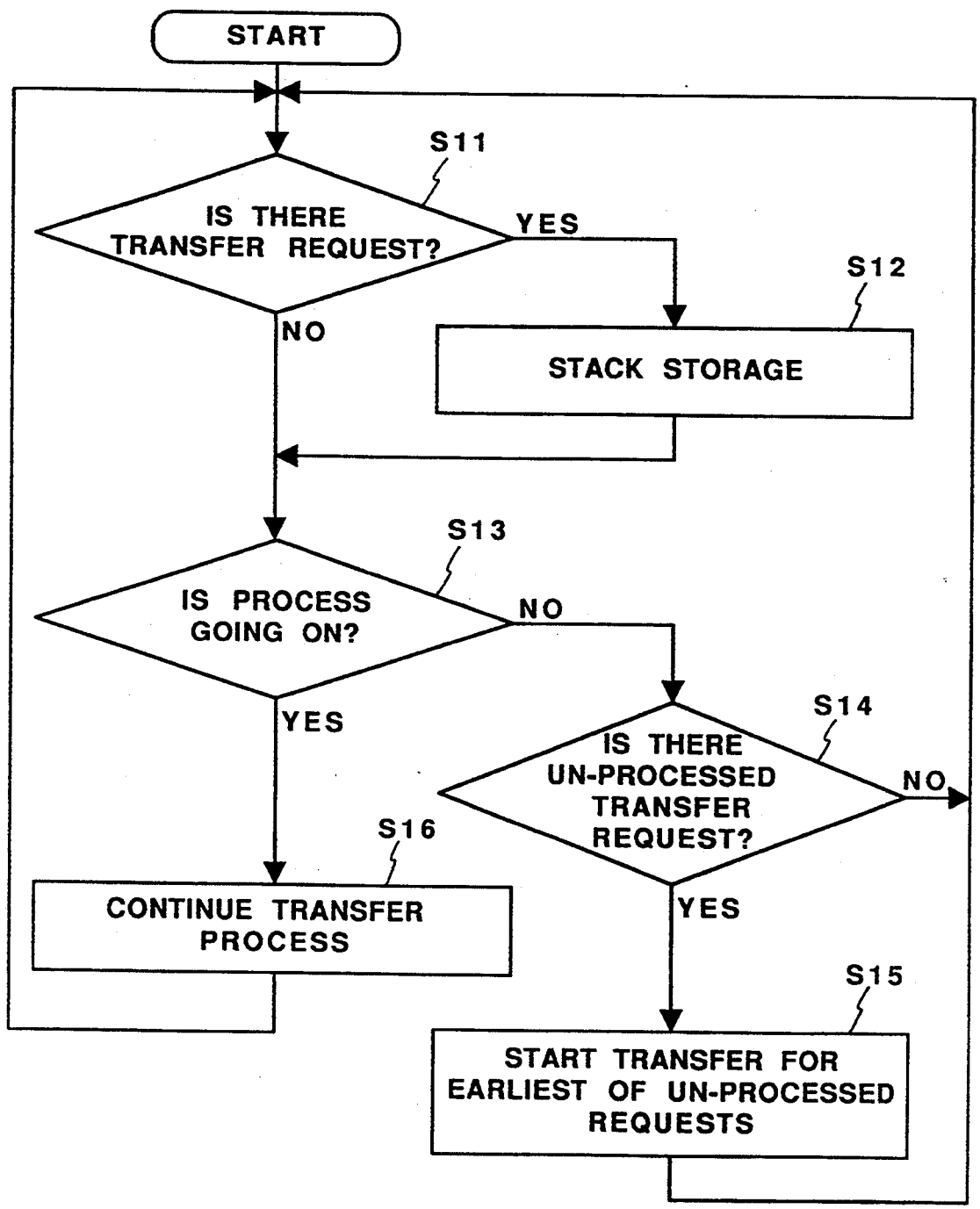
FIG. 6 is a flowchart illustrating a DMAC operation in that embodiment.

This DMA transfer, which is naturally effected on a hardware basis, will be described with reference to FIG. 6 so as to facilitate the understanding of the process. As stated above, this flowchart has been prepared for the purpose of illustrating the operation of the DMAC 110, and is not intended for program illustration.

First, in step S11, a judgment is made as to whether a transfer request has been received or not. When a transfer request has been received, stack-storage is effected in step S12 to enable detection as to from where the request has come. Assuming, for example, that the unit for the data to be stack-stored is 8 bit, each bit may be allocated to a respective circuit, and the bit corresponding to the circuit which has issued the request may be set and stored, thus enabling the above detection.

In step S13, a judgment is made as to whether a data transfer is going on or not. If a transfer process is being conducted, the procedure advances to step S16, where the transfer process is executed. Further, when it has been judged that a transfer process has been terminated or is on standby, the procedure advances to step S14, where a judgment is made as to whether there are any un-processed requests stack-stored. If there are such un-processed requests, a transfer process is started with respect to that one received earliest.

By performing such transfer processes while effecting unit conversion to 8 Kbyte unit, the transfer of all the data designated by the CPU 101 is effected. The amount for data of which the CPU 101 issues a transfer instruction is rather larger than 8 Kbytes. The DMAC 110 of this embodiment transfers the designated data in small units of 8 Kbytes. In this way, the transfer of image data read by the scanner 115 to the image memory section 106, the transfer of the data to the image processing circuit 111, and the transfer of coded data generated by the image processing circuit to the image memory section 106, are performed on the second bus 1b simultaneously.

Figure 4:
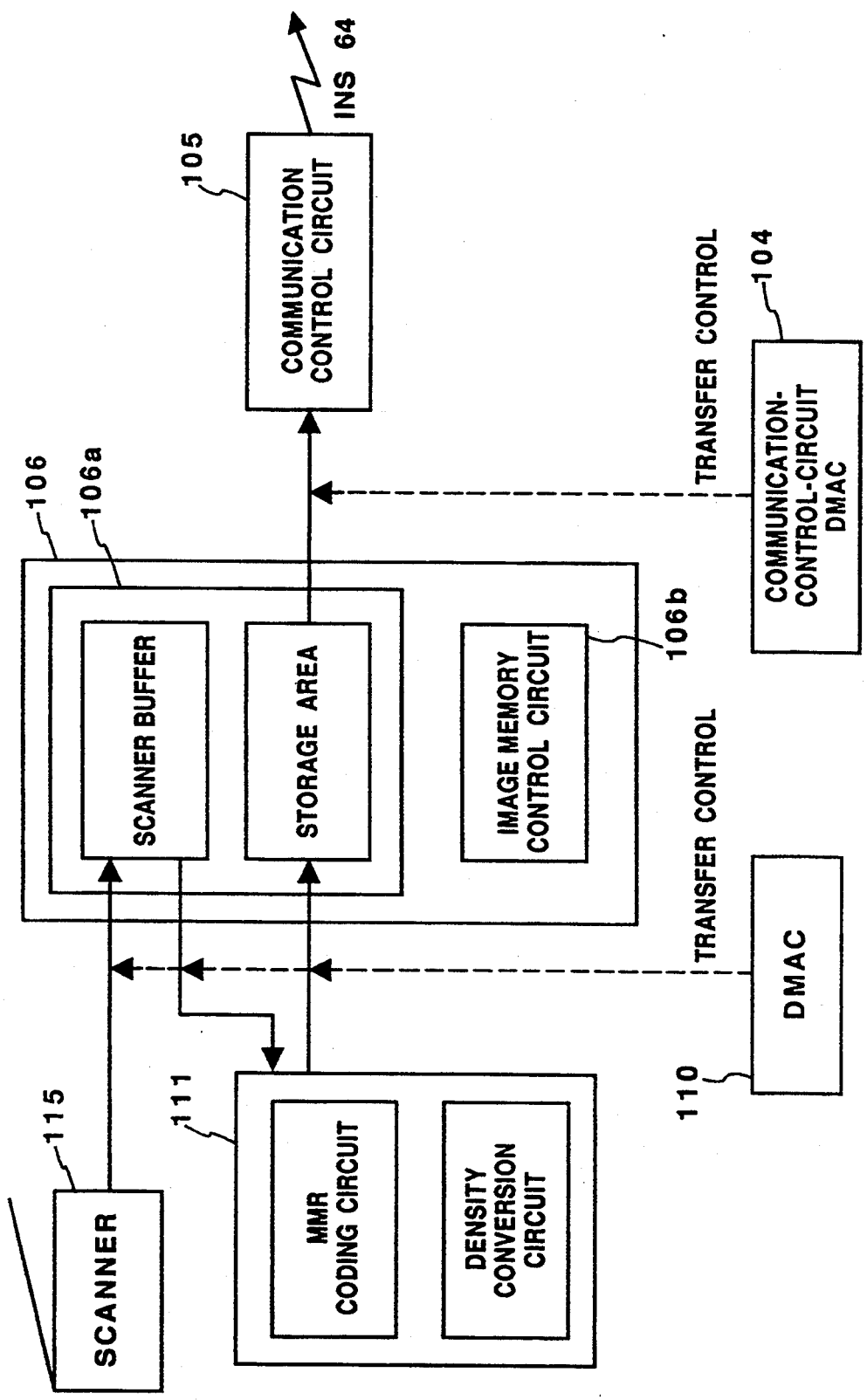
FIG. 4 is a diagram schematically illustrating a transmission data flow in the facsimile apparatus of the embodiment of FIG. 1.

FIG. 4 is a diagram schematically illustrating the data flow from the reading to the transmission of an original image, described above. The drawing, however, only shows those circuits which are related to these processes.

As shown in the drawing, the DMAC 110 performs the processes of transferring image data read by the scanner 115 to a scanner buffer provided in a predetermined area of the DRAM 106a, of transferring the data which has been thus transferred to the scanner buffer to the image data processing circuit 111, and of transferring coded data generated in the image processing circuit 111 to the predetermined area in the DRAM 106 again. As stated above, the transfer unit for inter-circuit or interdevice transfer is 8 Kbytes.

The communication-control-circuit DMAC 104 in the first bus transfers the coded data stored in the DRAM successively to the data communication control circuit 105 under the control of the CPU 101, thereby making it possible to transfer an image to an apparatus at the other end of the line.

The DMAC 110 does not substantially receive two or more transfer requests from any one circuit during 8 Kbyte data transfer. For, the data transfer to the image processing circuit 111 and the data transfer to the DRAM 106a therefrom are effected only when data from the scanner interface 113 has been stored in the DRAM 106a, the reading being performed relatively slowly as compared with the processes in the other circuits.

In the above description, the image density conversion, the coding, and the image transmission were conducted parallel with the reading of the original image. However, if the capacity of the DRAM 106 is large enough, it is possible to connect the line between the apparatus at the other end and the present apparatus and perform transmission after the storage of all the coded data has been completed. That is, it is also possible to perform transmission after the storage of the entire original image.

Figure 5:
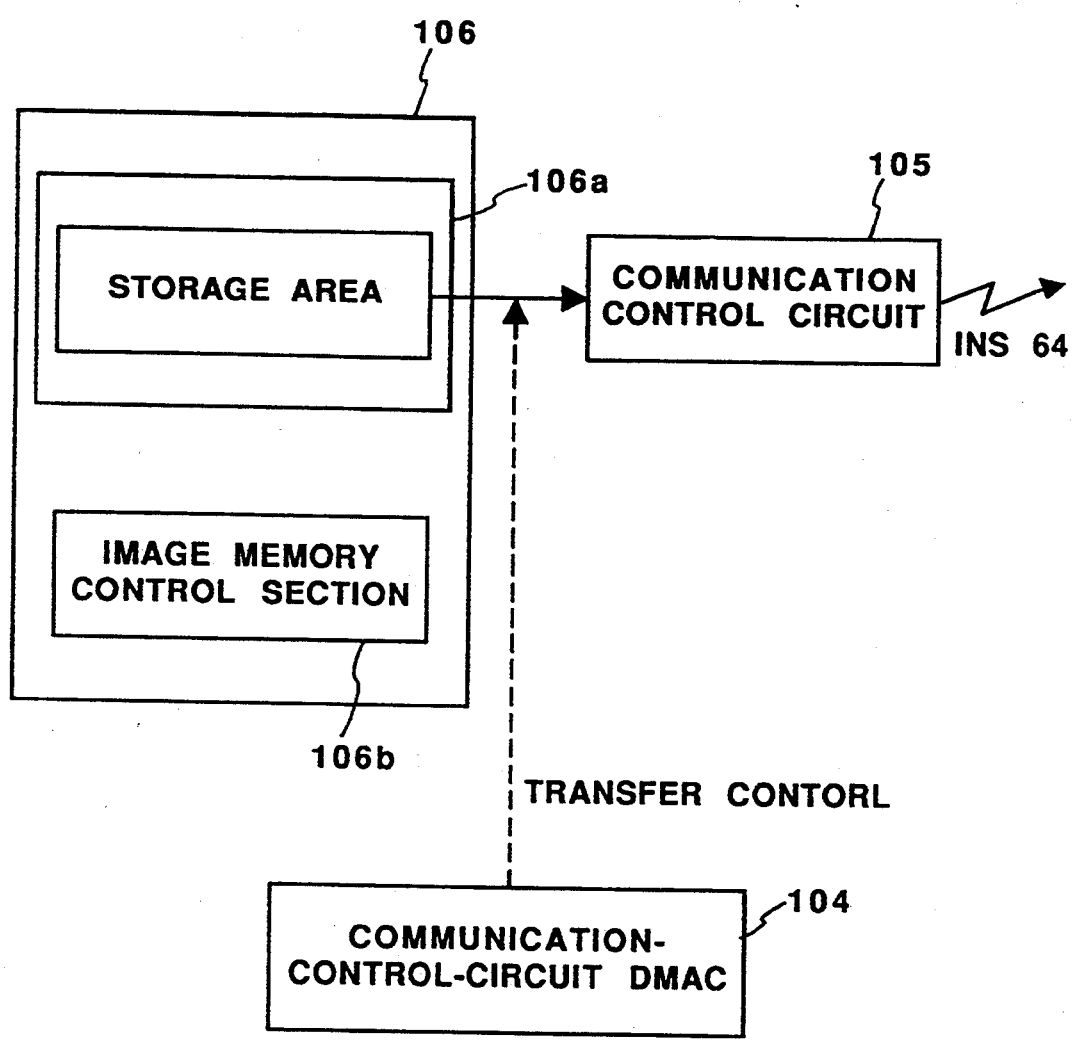
FIG. 5 is a diagram schematically illustrating a store-and-transmit data flow in the facsimile apparatus of that embodiment.

In that case, the CPU 101 may connect the line and give a transfer request to the communication-control-circuit DMAC 104 after the reading of the entire original image and the generation of the coded data have been completed. FIG. 5 shows the data flow in this case.

Further, if the capacity of the DRAM 106a is several megabytes or so, it is possible to file-store a plurality of transmission images through the above-described process, transmitting a designated file at a designated time.

As described above, the CPU 101 is capable of directly supervising the DMAC operation without any intermediation of the second bus. Accordingly, when one block of operation of each DMAC channel has been completed, it is possible to set another transfer request so that no idleness occurs in the channel operation. Further, since the CPU 101 is able to constantly supervise the operation of the DMAC, it is also possible to ascertain what data exists in the image memory 106. The CPU 101 utilizes this and sets, this time in the communication DMAC 104, the address of the image memory where the coded data in the image memory to be transferred to the communication control circuit 105 exists as well as the number of words to be transmitted. After performing the procedure necessary for communication, the communication control circuit 105 sends transmission data (code data) input by DMA transfer to the line 1c.

The process for receiving an image is the reverse of the process described above. The image receiving operation of the CPU 101 in this embodiment will be described with reference to FIG. 7. The operation described below is performed when there is a call-in through the line.

First, in step S21, the communication control circuit 105 is instructed to perform data reception. Then, in step S22, the parameters to be used when data (coded data) received through the communication control circuit 105 is successively transferred to the image memory section 106 are set in the communication-control-circuit DMAC 104. Then, in step S23, the setting of pixel density conversion rate is made with respect to the image processing circuit 111, and an instruction to perform decoding is given thereto. Next, in step S24, a parameter for the transfer from the image memory section 106 to the image processing circuit 111, a parameter for the transfer from the image processing circuit 111 to the image memory section 106, and a parameter for the transfer from the image memory section 106 to the printer interface circuit 112 are set in the DMAC 110, and, in step S25, a transfer start instruction is given to the DMAC 110.

This causes the received coded data to be decoded, and the decoded image data is converted so as to be adapted to the designated image density and made ready for printing by the printer 114.

The DMA transfer by the DMAC 110 at the time of data reception is substantially the same as that described above with reference to transmission, so a description thereof will be omitted here.

While in the above embodiment image transmission and image reception were described, it is obviously possible to perform memory transmission and memory reception by setting image data on standby in the image memory.

Further, since the CPU is capable of constantly supervising the operation of the DMAC and that of the the image processing circuit without any intermediation of the second bus, it is also possible to allow the two operations of transmission and reception to be performed by alternately making a switching between transmission and reception modes on each operation.

Likewise, in memory transmission and memory reception, it is possible to allow two types of image data in the image memory to be transmitted or received simultaneously. In the case of a line having two channels for ISDN line, it is possible to conduct simultaneous transmission or reception.

As described above, the CPU can give a request for data transfer through the second bus unitarily without any intermediation of the second bus, thus making it possible to construct an apparatus for performing high-speed image processing with a single CPU. Further, due to the simplified circuit configuration, the apparatus can be constructed less expensively. Furthermore, it is also possible for a single CPU to unitarily control transfer operations in the second bus, so that unlike the conventional construction having a plurality of CPUs, the construction of the present invention involves no time loss due to inter-CPU communication.

Further, while the above embodiment was described as applied to a facsimile apparatus, this should not be construed restrictively, as will be easily understood from the spirit of the present invention. Further, the number of buses is not restricted to two. It is naturally possible for the number to be three or more.

As described above, this embodiment makes it possible to realize an apparatus using two or more buses which is capable of performing high-speed processing through these buses with a small number of microprocessors.

Further, it is possible for the microprocessor to perform unitary processing without any intermediation of the second bus.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus comprising:
   a microprocessor for controlling the entire apparatus;
   a first bus connected to said microprocessor;
   at least one second bus which is not connected to said microprocessor;
   a memory connected to both said first and second buses and allowing access from each of said buses;
   at least one processing circuit connected to said second bus and adapted to perform a predetermined process with respect to given data under the control of said microprocessor; and
   DMA means connected to said first and second buses and adapted to perform a data transfer process on said second bus to or from at least one of said processing circuit and said memory on the basis of an instruction through said first bus from said microprocessor.

2. A data processing apparatus according to claim 1, wherein said processing circuit includes an image processing circuit comprising a resolution conversion circuit for converting a resolution of image data and a coding circuit for coding converted image data.

3. A data processing apparatus according to claim 2, wherein said image processing circuit is provided with an input buffer for temporarily storing data to be processed and an output buffer for temporarily storing coded data generated through processing.

4. A data processing apparatus comprising:
   a first bus connected to a microprocessor for controlling the entire apparatus;
   at least one second bus which is not connected to said microprocessor;
   a memory connected to said first and second buses; and
   memory control means which mediate between memory access from said first bus and memory access from said second bus,
   wherein said memory control means and said memory perform operations corresponding to the accesses in accordance with a clock of a frequency higher than that of clocks supplied to predetermined circuits connected to said first and second buses so as to accept the accesses from said first bus and the accesses from said second bus in parallel.

5. A facsimile apparatus for communicating image data comprising:
   a microprocessor for controlling the entire apparatus;
   a first bus connected to said microprocessor;
   at least one second bus which is not connected to said microprocessor;
   a memory connected to both said first and second buses and allowing access from each of the buses;
   reading means for reading original images;

an image processing circuit for coding image data transmitted thereto through said second bus, under the control of said microprocessor;

transmission means connected to said first bus and adapted to transmit information through a line;

first DMA means for (a) DMA-transferring image data read by said image reading means to said memory through said second bus, (b) DMA-transferring the image data transferred to said memory to said image processing circuit through said second bus, and (c) DMA-transferring data coded by said image processing circuit to said memory through said second bus, under the control of said microprocessor; and second DMA means for DMA-transferring the coded data transferred to said memory by said first DMA means to said transmission means through said first bus, under the control of said microprocessor.

6. A facsimile apparatus according to claim 5, wherein said image processing circuit includes a pixel density conversion circuit for converting a pixel density of image data transferred thereto by said first DMA means, said image processing circuit coding the image data converted by said pixel density conversion circuit.

7. A facsimile apparatus according to claim 5, wherein said first DMA means performs the DMA transfer processes (a), (b) and (c) in units of a predetermined data amount.

8. A facsimile apparatus according to claim 5, wherein said image processing circuit includes an input buffer for temporarily storing data to be image-processed and an output buffer for temporarily storing coded data which has been image-processed, the image data read from said memory being transferred to said input buffer by the DMA transfer process (b) of said first DMA means, the coded image data stored in said output buffer being transferred to said memory by the DMA transfer process (c).

9. A facsimile apparatus according to claim 5, wherein said memory includes memory control means which mediates between memory access from said first bus and memory access from said second bus so as to allow these buses to gain access in a predetermined order.

10. A facsimile apparatus according to claim 9, wherein the frequency of clocks in said memory is higher than that of clocks in said first and second buses.

11. A facsimile apparatus for communicating image data comprising:

a microprocessor for controlling the entire apparatus;

a first bus connected to said microprocessor;

at least one second bus which is not connected to said microprocessor;

a memory connected to both said first and second buses and allowing access from each of these buses;

receiving means connected to said first bus and adapted to receive coded image data through a line;

an image processing circuit for decoding coded image data transmitted thereto from said second bus, under the control of said microprocessor;

printing means for printing images;

first DMA transfer means for DMA-transferring the coded image data received by said receiving means to said memory through said first bus, under the control of said microprocessor; and second DMA transfer means for (a) DMA-transferring coded image data stored by said first DMA means to said image processing circuit through said second bus, (b) DMA-transferring the image data decoded by said image processing circuit to said memory through said second bus, and (c) DMA-transferring the decoded image data transferred to said memory to said printing means through said second bus, under the control of said microprocessor.

12. A facsimile apparatus according to claim 11, wherein said image processing circuit includes a pixel density conversion circuit for converting a pixel density of image data transferred thereto by said first DMA means, said image processing circuit decoding coded data transferred thereto and then converting the decoded image data so as to adapt it to a pixel density corresponding to said printing means.

13. A facsimile apparatus according to claim 11, wherein said second DMA means performs the DMA transfer processes (a), (b) and (c) in units of a predetermined data amount.

14. A facsimile apparatus according to claim 11, wherein said image processing circuit includes:

an input buffer for temporarily storing data to be image-processed; and an output buffer for temporarily storing decoded data which has been image-processed, image data read from said memory being transferred to said input buffer by the DMA transfer process (a) of said second DMA means, coded data stored in said output buffer being transferred to said memory by the DMA transfer process (b).

15. A facsimile apparatus according to claim 11, wherein the frequency of clocks in said memory is higher than that of clocks supplied to predetermined circuits connected to said first and second buses.

* * * * *

UNITED STATES PATENT AND TRADEMARK OFFICE
CERTIFICATE OF CORRECTION

PATENT NO. : 5,412,488                    Page 1 of 2

DATED      : May 2, 1995

INVENTOR   : YUKIHIKO OGATA

It is certified that errors appear in the above-identified patent and that said Letters Patent is hereby corrected as shown below:

On title page, item
[54] Title

"DATA PROCESSING APPARATUS" should be deleted.

COLUMN 1

Line 2, "DATA PROCESSING APPARATUS" should be deleted; and

Line 21, "scoring" should read --storing--.

COLUMN 6

Line 3, "circuit ill" should read --circuit 111--

COLUMN 7

Line 42, "8 bit," should read --8 bits,--; and

Line 59, "for data of" should read --of data for--.

COLUMN 8

Line 15, "interdevice" should read --inter-device--; and

Line 24, "For" should read --Therefore--.

UNITED STATES PATENT AND TRADEMARK OFFICE
CERTIFICATE OF CORRECTION

PATENT NO. : 5,412,488

DATED : May 2, 1995

INVENTOR : YUKIHIKO OGATA

It is certified that errors appear in the above-identified patent and that said Letters Patent is hereby corrected as shown below:

<u>COLUMN 9</u>

Line 40, "the" should be deleted.

Signed and Sealed this

Twenty-third Day of April, 1996

*Attest:*

*Attesting Officer*

BRUCE LEHMAN

*Commissioner of Patents and Trademarks*